United States Patent [19]
Pyo

[11] Patent Number: 5,903,127
[45] Date of Patent: May 11, 1999

[54] METHOD AND APPARATUS FOR CONTROLLING CURRENT IN A SWITCHED RELUCTANCE MOTOR

[75] Inventor: Sang-Yeon Pyo, Kyungki-Do, Rep. of Korea

[73] Assignee: Samsung Electronics Co., Ltd., Suwon-City, Rep. of Korea

[21] Appl. No.: 09/045,363

[22] Filed: Mar. 20, 1998

[30] Foreign Application Priority Data

Mar. 20, 1997 [KR] Rep. of Korea ......................... 97-9583

[51] Int. Cl.⁶ ...................................................... H02P 5/05

[52] U.S. Cl. ........................................... 318/701; 318/254

[58] Field of Search ..................................... 318/254, 448, 318/685, 696, 700, 701, 702

[56] References Cited

U.S. PATENT DOCUMENTS

| | | | |
|---|---|---|---|
| 4,868,477 | 9/1989 | Anderson et al. | 318/696 |
| 5,589,752 | 12/1996 | Iwasaki et al. | 318/701 |
| 5,796,226 | 8/1998 | Ookawa et al. | 318/254 |
| 5,852,355 | 12/1998 | Turner | 318/701 |

*Primary Examiner*—Bentsu Ro
*Attorney, Agent, or Firm*—Burns, Doane, Swecker & Mathis, L.L.P.

[57] ABSTRACT

Disclosed is a method and apparatus for controlling current in a switched reluctance motor (SRM), in which after measuring the rotating speed of the SRM and determining whether the motor is decelerated or accelerated, current signals each having a waveform suitable to the acceleration/deceleration and the rotating speed of the motor are read from a current waveform table of a memory and then transmitted, and the current signals are controlled and then transmitted to motor coils of each phase, thereby driving the motor.

4 Claims, 6 Drawing Sheets

FIG. 8A low speed
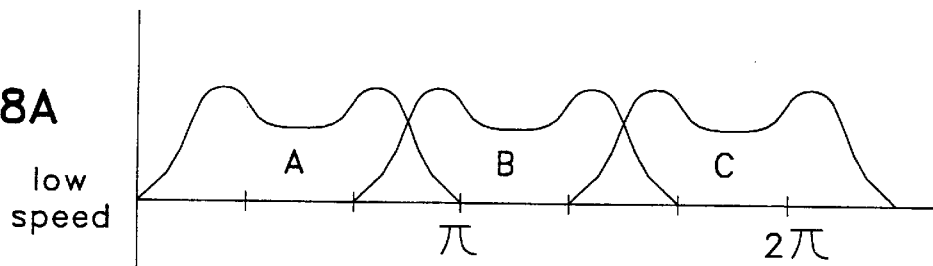
FIG. 8B middle speed
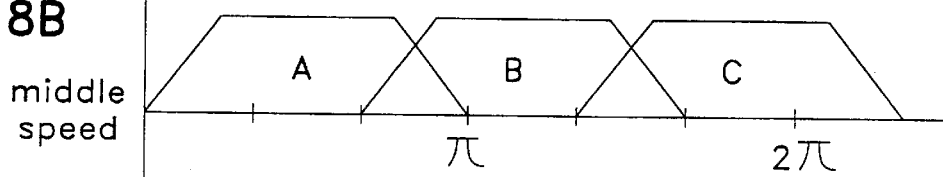
FIG. 8C high speed
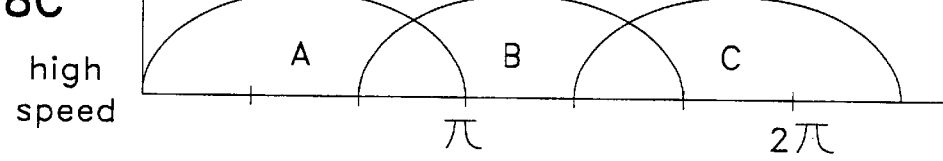
FIG. 8D low speed
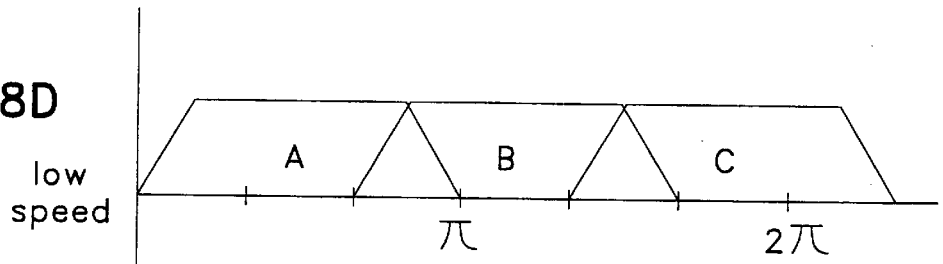
FIG. 8E middle speed
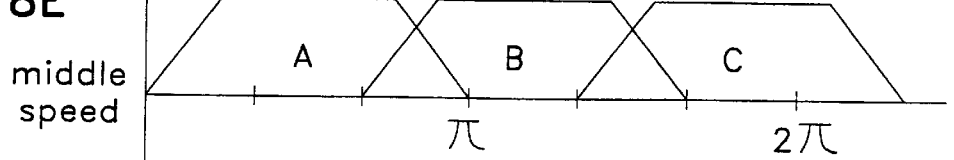
FIG. 8F high speed
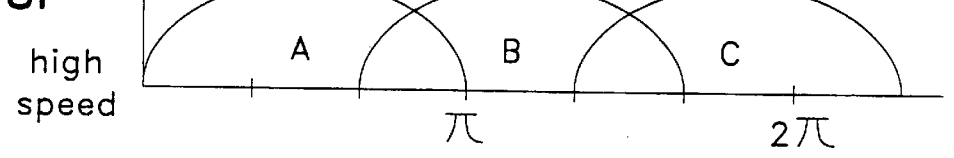

METHOD AND APPARATUS FOR CONTROLLING CURRENT IN A SWITCHED RELUCTANCE MOTOR

BACKGROUND OF THE INVENTION

1. Field of the Invention

The present invention relates to a method and apparatus for controlling current in a switched reluctance motor (SRM), and more particularly to a method and apparatus for controlling current in a switched reluctance motor (SRM) capable of reducing a noise caused by torque ripple when accelerating/decelerating the motor by sensing the position and speed of the motor through an optical sensor when driving the SRM and then supplying different current waveforms to each motor coil according to the sensed speed of the motor, thereby enhancing efficiency of the motor when rotating the motor at high speed.

2. Description of the Related Art

FIG. 1 is a block diagram illustrating the structure of a conventional switched reluctance motor (SRM). As shown in the drawing, the SRM includes a microcomputer 10 for transmitting a current control signal according to the position and speed sensed by an optical sensor (not illustrated); and an inverter circuit unit 20 for controlling the operation of the SRM according to the current control signal transmitted from the microcomputer 10.

FIG. 2 is a circuit diagram illustrating the inverter circuit unit 20 in detail. As shown in the drawing, the inverter circuit unit 20 includes field effect transistors FET1 to FET5 which are switched by the current control signal transmitted from the microcomputer 10; and current feedback diodes D1 to D6 which control the current applied in motor coils L1 to L3 of each phase of A, B and C.

FIG. 3 is a waveform of the current applied to the motor coils of each phase of A, B and C. When driving the SRM, the optical sensor senses the position and speed of the motor and transmits the sensed signal to the microcomputer 10.

The microcomputer 10 controls the current amount according to the position and speed of the motor and supplies the current to the field effect transistors FET1 and FET2; FET3 and FET4; and FET5 and FET6, successively.

Accordingly, the field effect transistors FET1 to FET6 are switched and then predetermined current waveforms illustrated in FIG. 3 are supplied to the motor coils L1, L2 and L3 of each phase of A, B and C, thereby rotating the SRM.

However, in the conventional SRM, since the current waveforms applied to the motor coils when driving the SRM are constant to the motor speed, noise caused by torque ripple can be generated when rotating the motor at low speed. Moreover, the efficiency of the motor is degraded by a current overlap when rotating the motor at high speed.

SUMMARY OF THE INVENTION

Therefore, it is an object of the present invention to reduce noise caused by torque ripple when accelerating or decelerating a switched reluctance motor (SRM).

It is another object of the present invention to enhance efficiency of the motor in the case of high speed rotating.

According to one aspect of the present invention, after measuring the rotating speed of the SRM and determining whether the motor is decelerated or accelerated, current signals each having a waveform corresponding to the acceleration/deceleration and the rotating speed of the motor are read from a current waveform table of a memory and then transmitted, and the current signals are controlled and then transmitted to motor coils of each phase, thereby driving the motor.

The current waveform can be read from the current waveform table stored in the memory of a microcomputer.

According to another aspect of the present invention, the microcomputer transmits current signals each having a different waveform according to the rotating speed and acceleration/deceleration of the SRM sensed by the optical sensor, and a current control circuit unit controls the size of the current signals transmitted from the microcomputer. In addition, an inverter circuit unit controls the operation of the motor after receiving the controlled current signals.

Preferably, the microcomputer has a memory equipped with the current waveform table.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein:

FIGS. 8A to 8F are waveforms of current applied to each phase of A, B and C according to the position and speed of the motor, in which:

FIGS. 8A to 8C are waveforms of current in each phase applied when the motor is accelerated; and FIGS. 8D to 8F are waveforms of current in each phase applied when the motor is decelerated.

DETAILED DESCRIPTION OF THE PREFERRED EMBODIMENTS

The objects, characteristics and advantages of the above-described invention will be more clearly understood through the preferable embodiments referring to the attached drawings.

Figure 4:
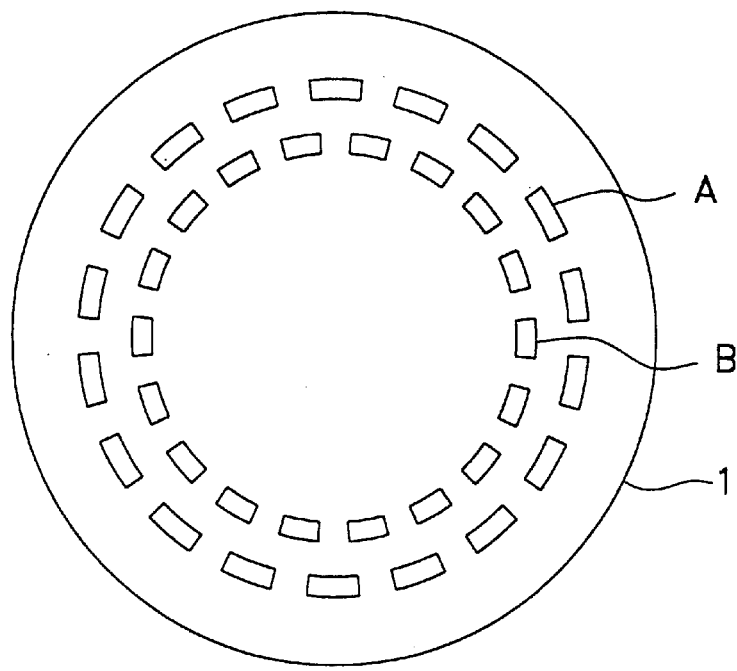
FIG. 4 is a view illustrating the structure of a conventional sensor plate applied to the present invention.
Figure 5:
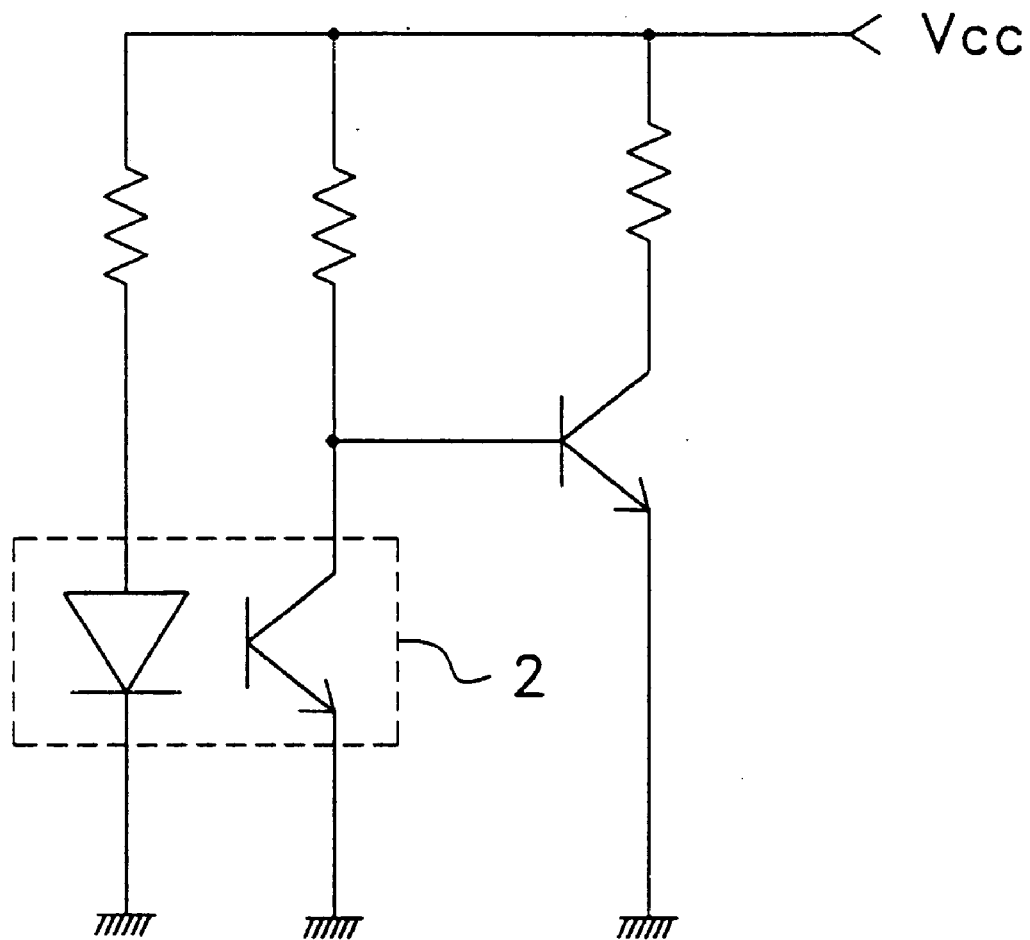
FIG. 5 is a circuit diagram of a conventional sensor applied to the present invention.

FIG. 4 is a view illustrating the structure of a conventional sensor plate applied to the present invention. As shown in the drawing, in order to sense the position of a rotor when a motor rotates, at the sensor plate 1, there are provided a slit group a having a plurality of slits which are perforated along the concentric circumference having a first radius; and a concentric slit group B having a plurality of slits which are perforated along the concentric circumference having a second radius smaller than the first radius. Generally, slits constituting the slit groups A and B are misaligned each other FIG. 5 is a circuit diagram of a conventional optical sensor applied to the present invention. An optical sensor 2 of FIG. 5 senses signals which pass through the slit groups A and B according to the position of the motor.

Figure 6:
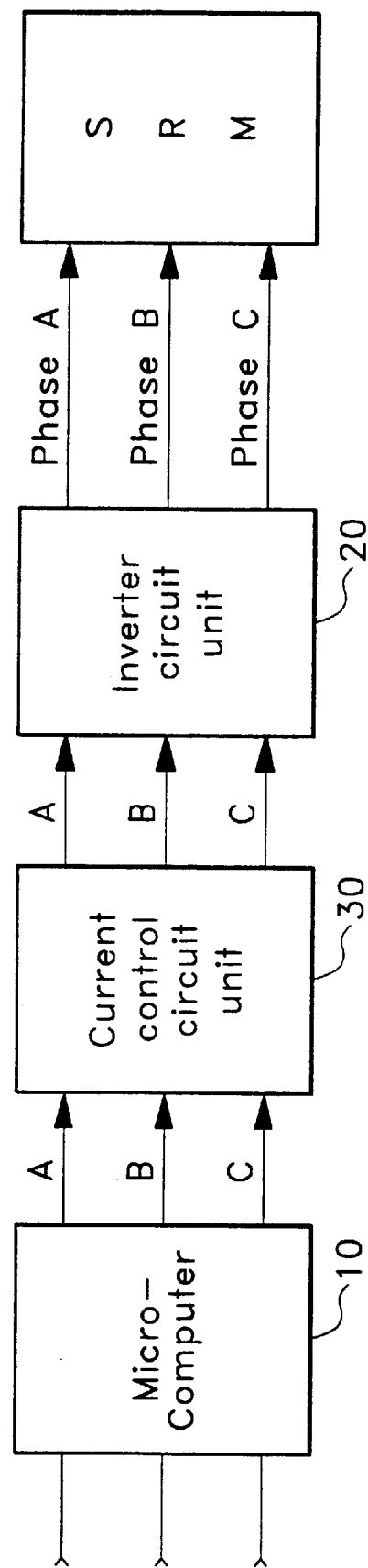
FIG. 6 is a block diagram illustrating the structure of a current control apparatus according to the present invention.

Referring to FIG. 6, a current control apparatus according to the present invention includes a microcomputer 10 for transmitting current signals each having a waveform corresponding to the position and speed of the motor sensed by the optical sensor when a switched reluctance motor (SRM) is operated; and an inverter circuit unit 20 for controlling the operation of the SRM according to the current signals transmitted from the microcomputer 10. Selectively, a current control circuit unit 30 can be further included which controls the current signals transmitted from the microcomputer according to the speed of the SRM and supplies them to motor coils L1 to L3 of each phase.

Figure 7:
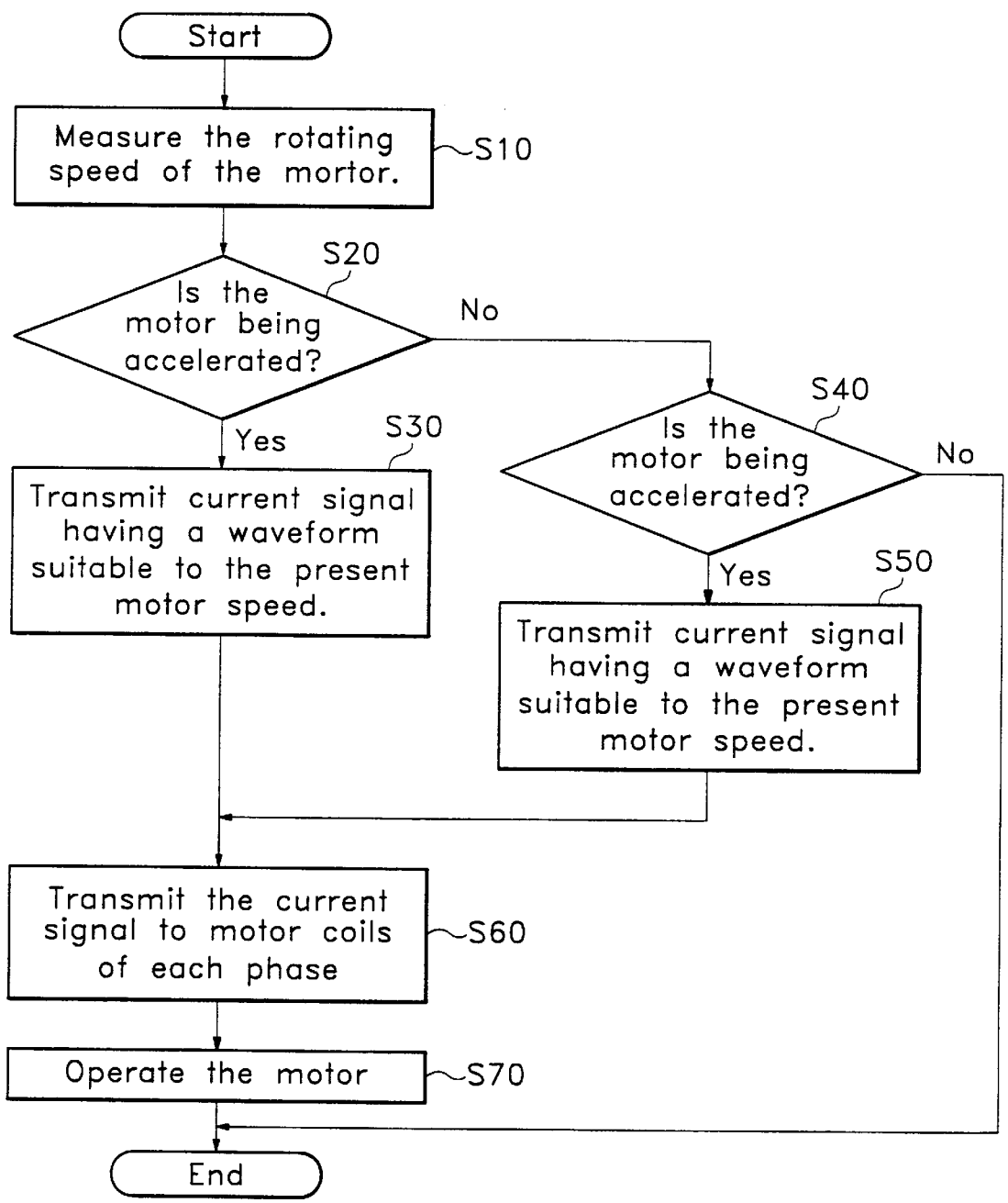
FIG. 7 is a flowchart for illustrating a method of controlling current according to the present invention.

FIG. 7 is a flowchart for illustrating a method of controlling current in the SRM according to the present invention. The method of controlling current in the SRM includes the steps of: measuring the rotating speed of the motor which is driven (step 10); determining whether the motor is being accelerated after measuring the rotating speed of the motor (step 20); in the case that it is determined that the motor is being accelerated, transmitting current signals each having a waveform suitable to the present motor speed (step 30); in the case that it is determined that the motor is being decelerated (step 40), transmitting the current signals each having a waveform suitable to the present motor speed (step 50); controlling the current signals which are transmitted and then transmitting the controlled signals to the motor coils of each phase (step 60); and driving the motor by the current signals which are transmitted.

FIGS. 8A to 8F are waveforms of current applied to each phase A, B and C according to the speed and acceleration/deceleration of the motor.

In other words, FIGS. 8A and 8C are waveforms of current applied to each phase when the motor is accelerated. Here, FIGS. 8A to 8C are current waveforms shown when the motor is accelerated at low speed, middle speed and high speed, respectively. In addition, FIGS. 8D to 8F are waveforms of current applied to each phase when the motor is decelerated. Here, FIGS. 8D to 8F are current waveforms shown when that the motor is decelerated at low speed, middle speed and high speed, respectively.

The operation and effect of the present invention having the above structure will be explained as follows.

First, when the sensor plate I senses the position of rotor corresponding to the position of a stator, the optical sensor 2 senses the position and speed of the SRM which passes through the slit groups A and B according to the position of the rotor, thereby transmitting the sensed position and speed of the motor to the microcomputer 10.

The microcomputer 10 measures the present speed of the SPM (step 10), and determines whether the measured speed of the SRM is being accelerated (step 20).

In the case that the motor is being accelerated, the microcomputer 10 reads the current waveform suitable to the present speed of the motor from a current waveform table stored in the microcomputer 10 and then transmits the read waveform to the current control circuit unit 30 (step 30). In other words, according to the present speed of the motor, one waveform out of the waveforms shown in FIGS. 8A to 8C is transmitted.

In the case that the motor is not being accelerated, it is determined whether the motor is being decelerated (step 40). When the motor is not being decelerated, the operation is ended. In the case that the motor is being decelerated, the microcomputer 10 reads the current waveform suitable to the present speed of the motor from the current waveform table stored in the microcomputer 10 and then transmits the read waveform to the current control circuit unit 30.

Figure 1:
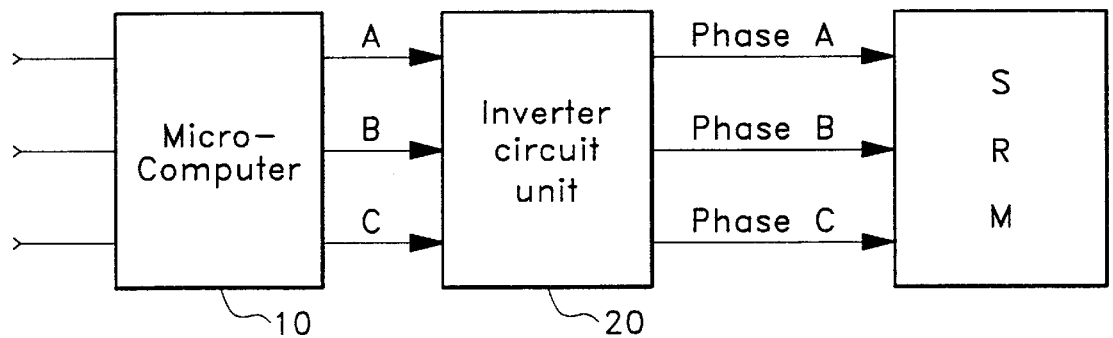
FIG. 1 is a block diagram illustrating the structure of a conventional switched reluctance motor (SRM)
Figure 2:
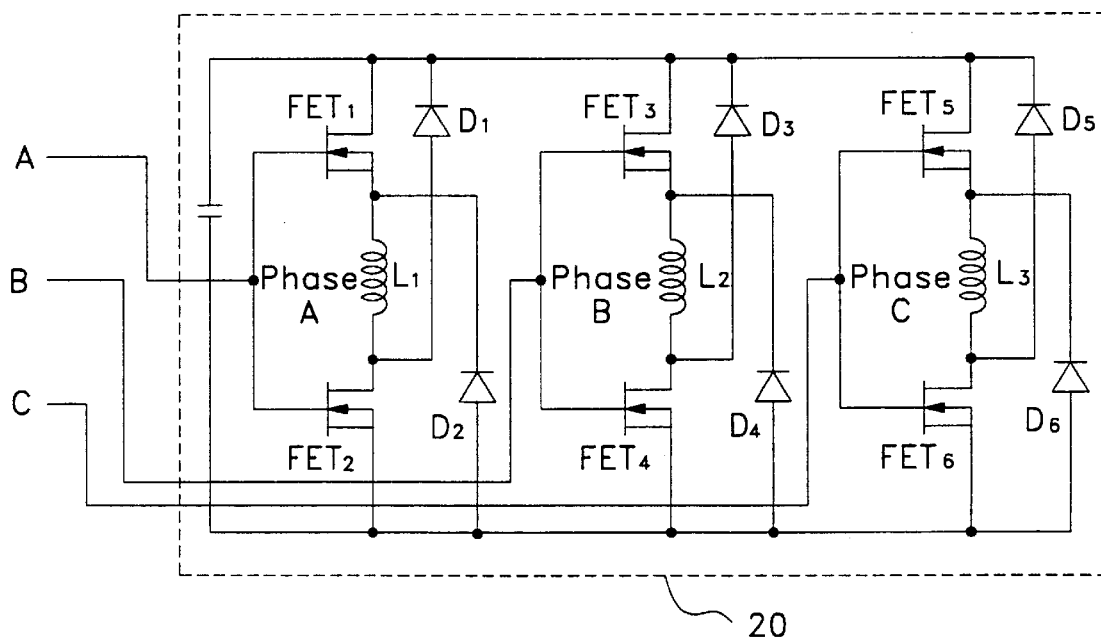
FIG. 2 is a circuit diagram illustrating an inverter circuit unit of FIG. 1 in detail.
Figure 3:
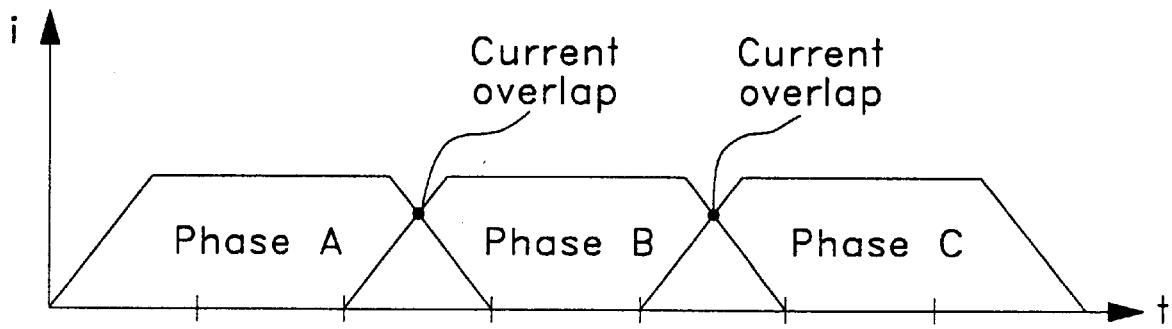
FIG. 3 is a waveform of current applied to motor coils of each phase of A, B and C when operating the SRM of FIG. 1.

After that, the current control circuit unit 30 controls the size of the current signals having waveforms suitable to the speed of the SRM and then applies the signals to field effect transistors FET1 to FET6, as shown in FIG. 2. Accordingly, the field effect transistors FET1 to FET6 are turned on, and thereby current each having a different current waveform is supplied to the motor coils L1 to L3 of each phase A, B and C (step 60).

In other words, in the case that the motor is being accelerated, when the motor speed is low, the current waveform illustrated in FIG. 8A is supplied to the motor coils L1 to L3 of each phase. When the motor speed is middle, the current waveform illustrated in FIG. 8B is supplied. In addition, when the motor speed is high, the current waveform illustrated in FIG. 8C is supplied. As a result, the SRM is operated. (step 70).

On the other hand, in the case that the motor is being decelerated, when the motor speed is low, the current waveform illustrated in FIG. 8D is supplied to the motor coils L1 to L3 of each phase. When the motor speed is middle, the current waveform illustrated in FIG. 8E is supplied. In addition, when the motor speed is high, the current waveform illustrated in FIG. 8F is supplied. As a result, the SRM is operated (step 70).

In short, current signals having different waveforms are supplied to the motor coils L1 to L3 of each phase A, B and C, according to the present rotating speed and the acceleration/deceleration of the SRM.

As described above, the present invention reduces noise caused by torque ripple when accelerating/decelerating the motor by sensing the position and speed of the motor when driving the SRM and then supplying different current waveforms to each motor coil according to the sensed speed of the motor, thereby enhancing efficiency of the motor when rotating the motor at high speed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of controlling current in a switched reluctance motor comprising the steps of:

measuring the rotating speed of said motor;

determining whether said motor is being accelerated or decelerated;

transmitting current signals each having a waveform suitable to the rotating speed and acceleration/deceleration of said motor;

controlling said current signals and then transmitting said signals to motor coils of each phase; and driving said motor by applying power to the motor through the transmitted current signals.

2. The method of claim 1, wherein said current waveforms are read from a current waveform table stored in a memory of a microcomputer.

3. An apparatus of controlling current in a switched reluctance motor comprising:

a microcomputer for transmitting current signals each having a different waveform according to the rotating speed and acceleration/deceleration of said motor sensed by an optical sensor;

a current control circuit unit for controlling the current signals transmitted from said microcomputer; and an inverter circuit unit for controlling the operation of said motor by receiving the current signals which are controlled.

4. The apparatus of claim 3, wherein said microcomputer has a memory equipped with a current waveform table.

* * * * *